United States Patent
Jeong et al.

(10) Patent No.: US 10,773,679 B2
(45) Date of Patent: Sep. 15, 2020

(54) AIRBAG APPARATUS

(71) Applicant: HYUNDAI MOBIS CO., LTD., Seoul (KR)

(72) Inventors: Ga Ram Jeong, Yongin-si (KR); Hae Kwon Park, Yongin-si (KR); Seok Min Lee, Yongin-si (KR); Rae Ick Jang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 76 days.

(21) Appl. No.: 16/158,101

(22) Filed: Oct. 11, 2018

(65) Prior Publication Data

US 2019/0106074 A1 Apr. 11, 2019

(30) Foreign Application Priority Data

Oct. 11, 2017 (KR) ........................ 10-2017-0129583

(51) Int. Cl.
*B60R 21/233* (2006.01)
*B60R 21/2338* (2011.01)
*B60R 21/00* (2006.01)

(52) U.S. Cl.
CPC ........ *B60R 21/233* (2013.01); *B60R 21/2338* (2013.01); *B60R 2021/0009* (2013.01); *B60R 2021/0048* (2013.01); *B60R 2021/23308* (2013.01); *B60R 2021/23324* (2013.01); *B60R 2021/23382* (2013.01)

(58) Field of Classification Search
None
See application file for complete search history.

(56) References Cited

U.S. PATENT DOCUMENTS

| | | | | |
|---|---|---|---|---|
| 9,650,011 | B1* | 5/2017 | Belwafa | B60R 21/233 |
| 2006/0071461 | A1* | 4/2006 | Williams | B60R 21/2338 280/739 |
| 2007/0126219 | A1* | 6/2007 | Williams | B60R 21/2338 280/739 |
| 2008/0023950 | A1* | 1/2008 | Kalczynski | B60R 21/2338 280/739 |
| 2008/0073893 | A1* | 3/2008 | Schneider | B60R 21/2338 280/740 |
| 2009/0152842 | A1* | 6/2009 | Benny | B60R 21/201 280/728.3 |
| 2009/0230663 | A1* | 9/2009 | Mills | B60R 21/233 280/735 |

(Continued)

*Primary Examiner* — Drew J Brown
(74) *Attorney, Agent, or Firm* — Knobbe Martens Olson & Bear LLP

(57) ABSTRACT

An airbag apparatus may include: a first chamber connected to an inflator, and supporting the head of a passenger in case of a head-on collision of a vehicle; a second chamber connected to one side of the first chamber, expanded toward the rear of the vehicle, and suppressing the head of the passenger from moving in a diagonal direction based on the front of the vehicle, in case of an oblique collision of the vehicle; a tube part coupled to the first chamber to introduce gas of the first chamber into the second chamber, and having a ring-shaped tightening part formed along the circumference thereof; and a tether part having one end coupled to the first chamber and the other end passed through the tightening part, and closing the tube part after the first chamber is completely deployed.

4 Claims, 7 Drawing Sheets

(56) References Cited

U.S. PATENT DOCUMENTS

| | | | | |
|---|---|---|---|---|
| 2010/0225095 A1* | 9/2010 | Smith | ............... | B60R 21/2338 |
| | | | | 280/729 |
| 2013/0334801 A1* | 12/2013 | Williams | ............. | B60R 21/239 |
| | | | | 280/739 |
| 2014/0300094 A1* | 10/2014 | Williams | ............. | B60R 21/239 |
| | | | | 280/743.2 |
| 2015/0298643 A1* | 10/2015 | Schneider | ............ | B60R 21/239 |
| | | | | 280/729 |
| 2015/0375711 A1* | 12/2015 | Umehara | ............. | B60R 21/239 |
| | | | | 280/740 |
| 2017/0120856 A1* | 5/2017 | Sumiya | ................ | B60R 21/205 |
| 2018/0312131 A1* | 11/2018 | Jeong | ................. | B60R 21/2338 |
| 2019/0039557 A1* | 2/2019 | Barnes | ................ | B60R 21/231 |
| 2019/0061671 A1* | 2/2019 | Jang | .................... | B60R 21/261 |

* cited by examiner

AIRBAG APPARATUS

CROSS-REFERENCES TO RELATED APPLICATIONS

The present application claims priority to Korean application number 10-2017-0129583, filed on Oct. 11, 2017, which is incorporated by reference in its entirety.

BACKGROUND OF THE INVENTION

The present invention relates to an airbag apparatus, and more particularly, to an airbag apparatus capable of suppressing the head of a passenger from moving in a diagonal direction in case of an oblique collision of a vehicle.

In general, a vehicle includes airbags to protect a passenger. The airbags are disposed at various positions depending on a passenger's parts which need to be protected. A steering wheel includes a driver airbag to protect the head of a driver, and a passenger airbag is installed at the front of the vehicle so as to protect the head of a passenger seated beside the driver.

In case of a head-on or oblique collision of the vehicle, an electronic control module decides whether to ignite the detonator of an inflator. When gas is generated from the inflator, an airbag cushion is expanded by the generated gas. Recently, the strict regulations for passenger protection have increased the size of the airbag cushion.

However, when gas leaks from the airbag cushion after the airbag cushion is completely expanded, the support force or expensive force of the airbag cushion is reduced. In this case, the airbag cushion may not suppress the head from moving in a diagonal direction.

Furthermore, when the size of the airbag cushion is increased, the expansion time of the airbag cushion may be increased. Thus, in case of an oblique collision of the vehicle, the time to hold the head may be delayed to cause an injury to the head or neck of a passenger.

SUMMARY OF THE INVENTION

Embodiments of the present invention are directed to an airbag apparatus capable of suppressing the head of a passenger from moving in a diagonal direction in case of an oblique collision of a vehicle.

In one embodiment, an airbag apparatus may include: a first chamber connected to an inflator, and supporting the head of a passenger in case of a head-on collision of a vehicle; a second chamber connected to one side of the first chamber, expanded toward the rear of the vehicle, and suppressing the head of the passenger from moving in a diagonal direction based on the front of the vehicle, in case of an oblique collision of the vehicle; a tube part coupled to the first chamber to introduce gas of the first chamber into the second chamber, and having a ring-shaped tightening part formed along the circumference thereof; and a tether part having one end coupled to the first chamber and the other end passed through the tightening part, and closing the tube part after the first chamber is completely deployed, wherein the length of the tether part is smaller than the sum of the length of a straight line from the completely deployed first chamber to the tube part and the circumference of the tube part.

The length of the tether part may range form 65% to 75% of the sum of the length of the straight line from the completely deployed first chamber to the tube part and the circumference of the tube part.

The tether part may include: a tether ring part installed through the tightening part; and a tether body having one end connected to the tether ring part and the other end coupled to the first chamber, and closing the tube part by pulling the tether ring part when the first chamber is completely deployed.

The tether ring part may have a passage ring formed at one side thereof, such that the tether body is passed through the passage ring.

The tightening part may be formed through a process of doubling one side of the tether ring part and fixing the doubled portion of the tether ring part through a tether sewing part.

The tube part may be formed of the same material as the first and second chambers.

DESCRIPTION OF SPECIFIC EMBODIMENTS

Hereafter, an airbag apparatus in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
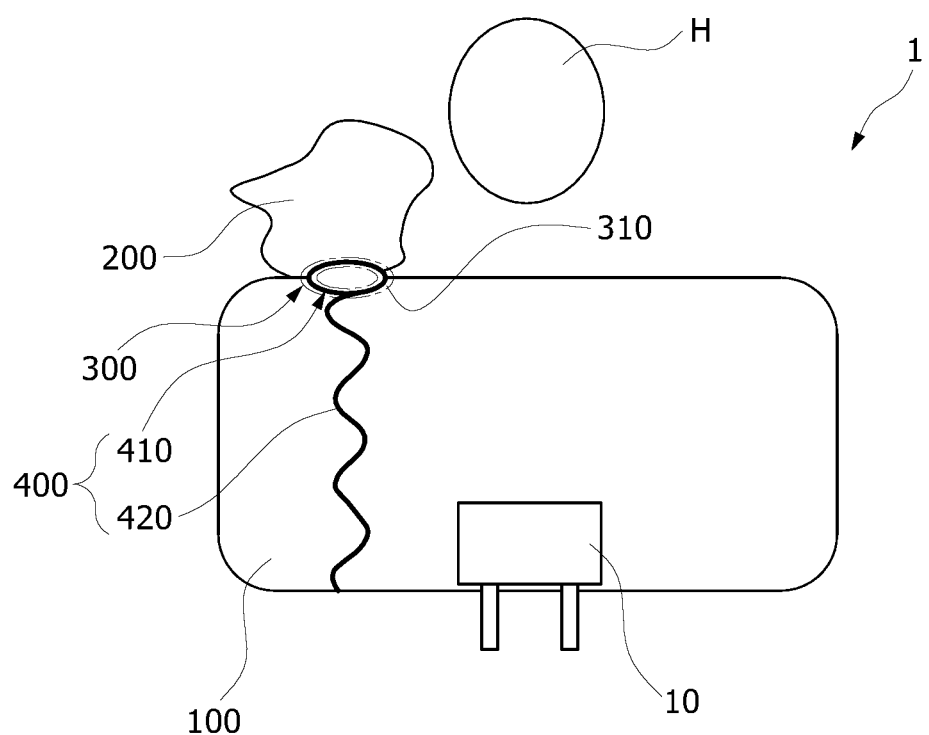
FIG. 1 is a conceptual view illustrating the initial state of deployment of an airbag apparatus in accordance with an embodiment of the present invention.
Figure 2:
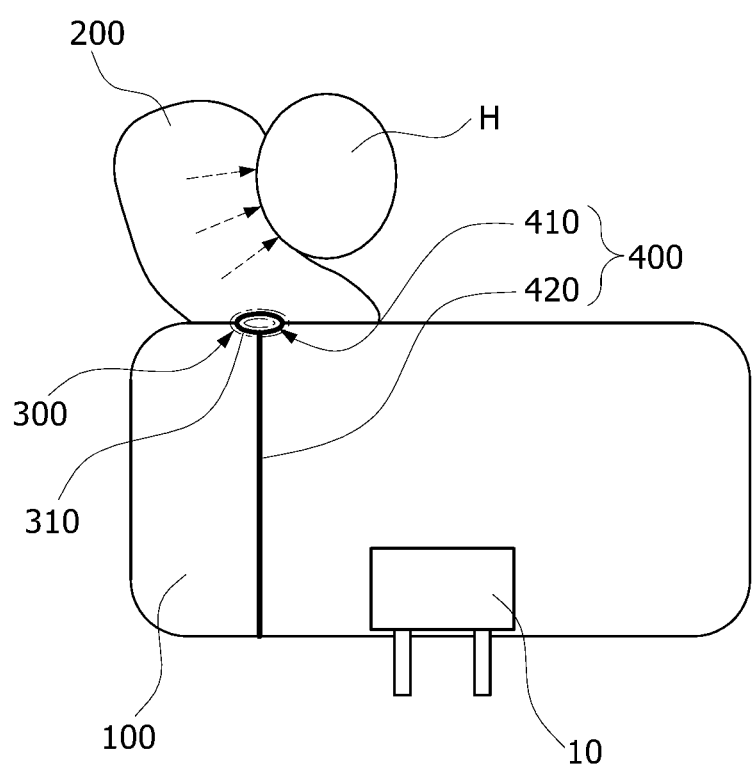
FIG. 2 is a conceptual view illustrating the middle state of the deployment of the airbag apparatus in accordance with the embodiment of the present invention.
Figure 3:
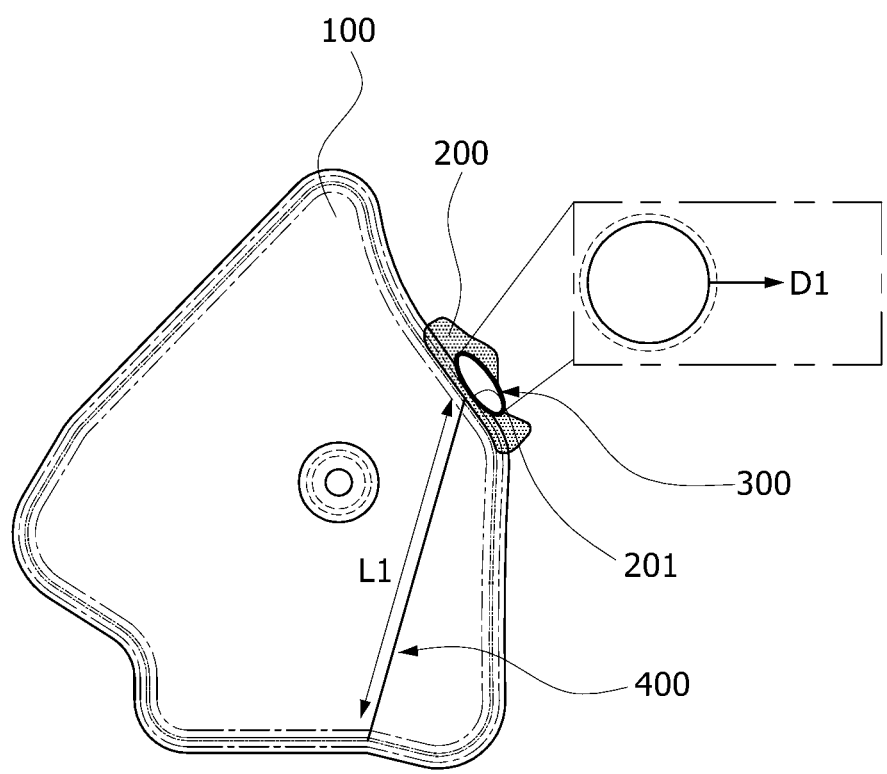
FIG. 3 is a side view illustrating the initial state of the deployment of the airbag apparatus in accordance with the embodiment of the present invention.
Figure 4:
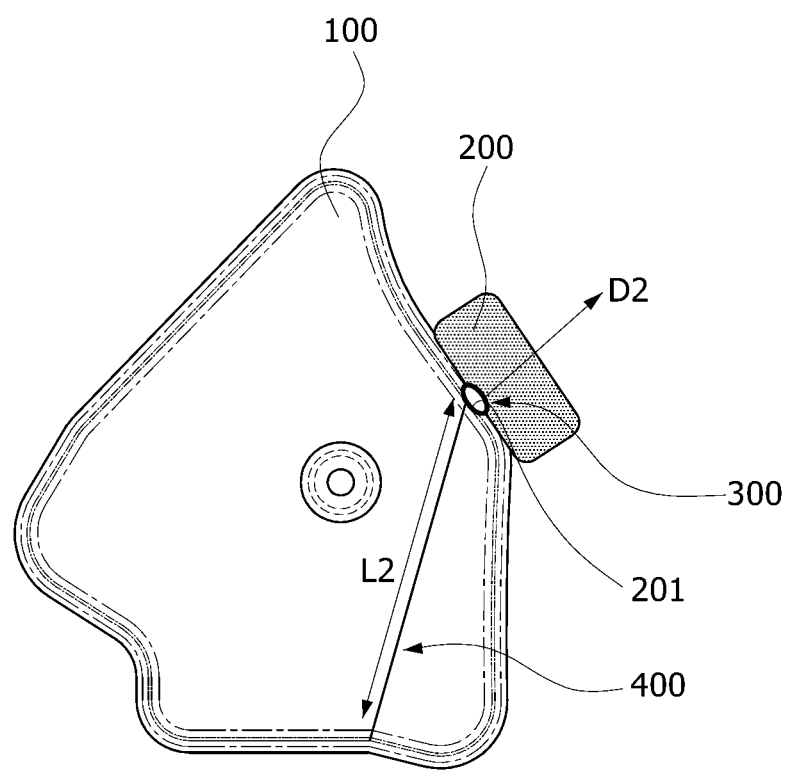
FIG. 4 is a side view illustrating the middle state of the deployment of the airbag apparatus in accordance with the embodiment of the present invention.
Figure 5:
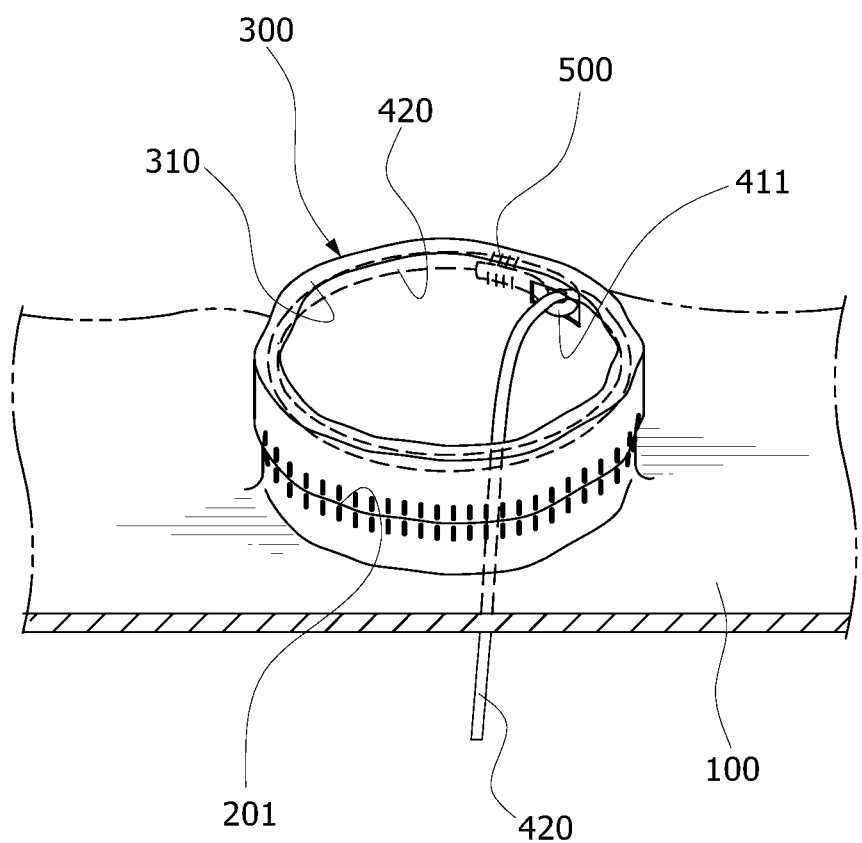
FIG. 5 is a partial perspective view illustrating a tube part and a tether part in accordance with the embodiment of the present invention.
Figure 6:
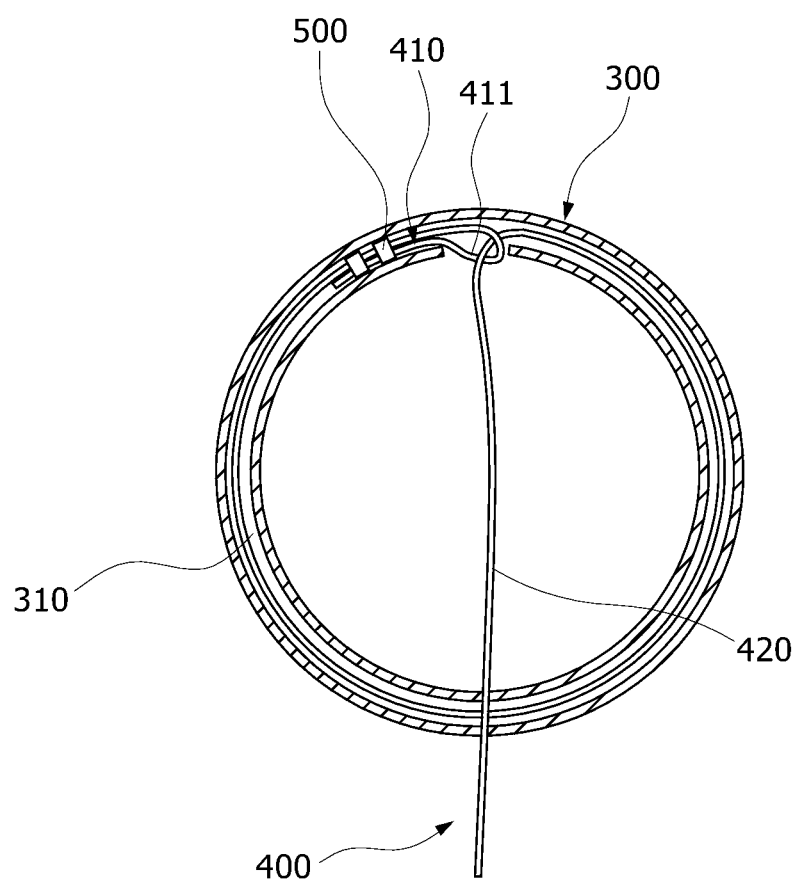
FIG. 6 is a cross-sectional view illustrating the tube part and the tether part in accordance with the embodiment of the present invention.
Figure 7:
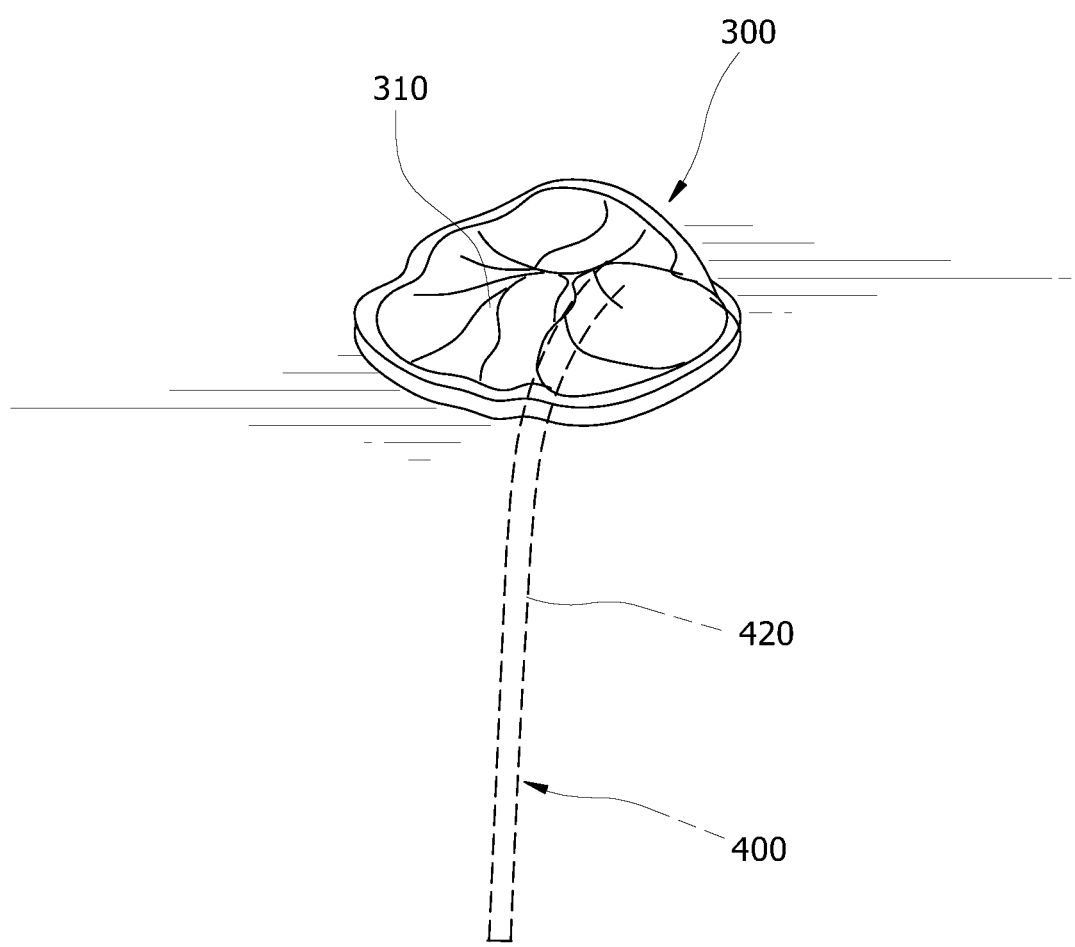
FIG. 7 is a perspective view illustrating that the tube part is closed in the airbag apparatus in accordance with the embodiment of the present invention.

FIG. 1 is a conceptual view illustrating the initial state of deployment of an airbag apparatus in accordance with an embodiment of the present invention. FIG. 2 is a conceptual view illustrating the middle state of the deployment of the airbag apparatus in accordance with the embodiment of the present invention. FIG. 3 is a side view illustrating the initial state of the deployment of the airbag apparatus in accordance with the embodiment of the present invention. FIG. 4 is a side view illustrating the middle state of the deployment of the airbag apparatus in accordance with the embodiment of the present invention. FIG. 5 is a partial perspective view illustrating a tube part and a tether part in accordance with the embodiment of the present invention. FIG. 6 is a cross-sectional view illustrating the tube part and the tether part in accordance with the embodiment of the present invention. FIG. 7 is a perspective view illustrating that the tube part is closed in the airbag apparatus in accordance with the embodiment of the present invention.

Referring to FIGS. 1 to 7, the airbag apparatus 1 in accordance with the embodiment of the present invention may include a first chamber 100, a second chamber 200, a tube part 300, a tether part 400 and a tether sewing part 500.

The first chamber 100 may be connected to an inflator 10. The first chamber 100 may have a rectangular box shape when completely deployed. The first chamber 100 may be supported by an instrument panel (not illustrated) at the inner front of the vehicle.

The first chamber 100 may be formed in front of a passenger so as to support the head H of the passenger in case of a head-on collision of the vehicle.

Referring to FIGS. 1 and 3, the second chamber 200 in accordance with the embodiment of the present embodiment may be connected to one side of the first chamber 100, and suppress the head H of the passenger from moving in a diagonal direction based on the front of the vehicle, in case of an oblique collision of the vehicle.

The second chamber 30 may be connected to the rear side (top side in FIG. 1) of the first chamber 100 so as to be supported by the first chamber 100, and support the head H of the passenger in case of an oblique collision of the vehicle. The second chamber 200 may have a first passage 201 through which gas of the first chamber 100 is introduced. When the second chamber 200 is completely expanded, the second chamber 30 may have a rectangular box shape.

The airbag apparatus 1 in accordance with the embodiment of the present invention may be divided into the first and second chambers 100 and 200, and the gas may be first supplied to the first chamber 100 by the single inflator 10, and then passed through the first passage 201 so as to deploy the second chamber 200.

Therefore, a plurality of inflators 10 do not need to be installed. The reduction in the installation number of inflators 10 can lower the manufacturing cost of the vehicle.

In addition, since a plurality of inflators 10 do not need to be installed, the size and weight of the airbag apparatus 1 can be reduced.

Referring to FIGS. 5 to 7, the tube part 300 in accordance with the embodiment of the present invention may be coupled to the first chamber 100 so as to introduce the gas of the first chamber 100 into the second chamber 200. Specifically, the tube part 300 may be installed on the first passage 201.

The tube part 300 may be formed along the inside of the first passage 201. However, the present invention is not limited thereto, but the tube part 300 may be modified in various manners. For example, the tube part 300 may overlap the first passage 201 such that gas flows from the first chamber through the first passage 201 to the second chamber 200.

The tube part 300 may have a ring-shaped tightening part 310 formed along the circumference thereof. The tube part 300 may be formed of a contractible material. Furthermore, the tube part 300 may be formed of the same material as the first and second chambers 100 and 200, and thus folded to close the first passage 201 or the tightening part 310 when the airbag apparatus 1 is deployed.

Referring to FIGS. 5 to 7, the tether part 400 in accordance with the embodiment of the present invention may be passed through the tube part 300 and connected to the first chamber 100, and include a tether ring part 410 and a tether body 420.

Referring to FIG. 5, the tether ring part 410 in accordance with the embodiment of the present invention may be installed through the tube part 300 or specifically the tightening part 310. The tether body 420 may have one end connected to the tether ring part 410 and the other end connected to the first chamber 100.

Referring to FIGS. 3 and 4, the length of the tether part 400 may be set to a smaller length than the sum of the length L1 of a straight line from where the tether part 400 is sewed on the first chamber 100 to the tube part 300 when the first chamber 100 is completely deployed and the circumference D1 of the tube part 300 when the first passage 201 is opened.

Referring to FIG. 4, the length of the tether part 400 in accordance with the embodiment of the present invention may indicate the sum of the length L2 of the straight line from where the tether part 400 is sewed on the first chamber 100 to the tube part 300 when the first chamber 100 is completely deployed and the circumference D2 of the tube part 300 when the first passage 201 is closed.

Specifically, only when the tether part 400 has a length than the sum of the length L1 of the straight line from where the tether part 400 is sewed on the first chamber 100 to the tube part 300 in the case where the first chamber 100 is completely deployed and the circumference D1 of the tube part 300, the gas can be introduced into the second chamber 200 through the first chamber 100, and blocked from flowing back to the first chamber 100 after the second chamber 200 is completely deployed.

Preferably, the length L2+D2 of the tether part 400 may range from 65% to 75% of the sum of the length L1 of the straight line from the first chamber 100 to the tube part 300 when the first chamber 100 is completely deployed and the circumference D1 of the tube part 300.

Referring to FIG. 6, the tether ring part 410 in accordance with the embodiment of the present invention may have a passage ring 411 formed at one side thereof, such that the tether body 420 is passed through the passage ring 411. The passage ring 411 may be formed in a ring shape, and the tether body 420 may be passed through the passage ring 411.

Referring to FIGS. 5 and 6, the tether sewing part 500 in accordance with the embodiment of the present invention may be installed on the tightening part 310. Specifically, the tether sewing part 500 may be installed in a section where one side of the tether ring part 410 overlaps the tightening part 310.

The tether sewing part 500 may be formed through a sewing method, and fix and couple one side of the tether ring part 410 to the tightening part 310.

Therefore, the tightening part 310 may be folded by the tether body 420 passed through the tether ring part 410, and close the tube part 300 and the first passage 201, thereby blocking gas from flowing back to the first chamber 100, the gas having deployed the second chamber 200.

The operation principle and effect of the airbag apparatus 1 having the above-described structure will be described.

Referring to FIG. 1, gas generated from the inflator 10 may be injected into the first chamber 100 in case of an oblique collision of the vehicle. The first chamber 100 may be deployed while expanded toward the rear side of the vehicle (top side in FIG. 1). The gas of the first chamber 100 may be introduced into the second chamber 200 through the first passage 201.

Referring to FIG. 1 illustrating the initial stage of the deployment of the airbag apparatus 1 in accordance with the embodiment of the present invention, the tether part 400 or specifically the tether ring part 410 and the tether body 420 may not be completely extended, and the tether body 420 may not pull the tether ring part 410.

Since the tether body 420 does not pull the tether ring part 410, the tightening part 310 formed in the tube part 300 may not be tightened, and the tube part 300 may not be closed. When the tube part 300 is not closed, the gas of the first chamber 100 may flow into the second chamber 200 through the first passage 201.

Referring to FIG. 2, the gas may be introduced into the second chamber 200 through the first passage 201 after the deployment of the first chamber 100 is completed. Then, the second chamber 200 may be completely deployed.

At this time, since the tube part 300 is moved toward the rear of the first chamber 100, the tether body 420 may be tightly extended toward the rear side of the vehicle (top side in FIG. 1), and the tether ring part 410 may tighten the tube part 300 or specifically the tightening part 310, using the tensile force of the tether body 420.

Since the tube part 300 is closed while the tether body 420 caught by the tether part 400 or specifically the tether ring part 410 tightens the tightening part 310, it is possible to prevent not only gas discharge from the second chamber 200 to the first chamber 100, but also a reduction in expensive force or support force of the second chamber 200.

Referring to FIG. 6, the passage ring 411 may be formed at one side of the tether ring part 410, such that the tether body 420 passes through the passage ring 411. Furthermore, the tether body 420 may be passed through the passage ring 411 along the inside of the tube part 300 or specifically the tightening part 310, and coupled to the first chamber 100.

Therefore, when the second chamber 200 is completely deployed by the gas introduced into the second chamber 200 from the first chamber 100 after the deployment of the first chamber 100 is completed, the tube part 300 may be closed while the tube part 300 or specifically the tightening part 310 is tightened by the tensile force of the tether body 420.

When the tube part 300 is closed, the first passage 201 may be closed to block a gas flow between the first chamber 100 and the second chamber 200. Specifically, a gas flow from the second chamber 200 to the first chamber 100 can be blocked to maintain the inner pressure of the second chamber 200.

The length of the tether part 400 may be smaller than the sum of the length L1 of the straight line from the first chamber 100 to the tube part 300 when the first chamber 100 is completely deployed and the circumference D1 of the tube part 300.

Referring to FIGS. 3 and 4, the length of the tether part 400 in the initial state in which the gas is not yet introduced into the second chamber 200 after the deployment of the first chamber 100 may be smaller than the sum of the length L1 of the straight line from the first chamber 100 to the tube part 300 and the circumference D1 of the tube part 300.

Referring to FIG. 4, the length of the tether part 400 may indicate the sum of the length L2 of the straight line from the first chamber 100 to the tube part 300 in the middle state of the deployment and the circumference D2 of the tube part 300 when the tube part 300 is closed.

When the length of the tether part 400 is equal to or more than the sum of the length L1 of the straight line from the first chamber 100 to the tube part 300 and the circumference D1 of the opened tube part 300, the gas may flow from the completely deployed second chamber 200 to the first chamber 100, and the inner pressure of the second chamber 200 may not be maintained, because the tube part 300 is not closed.

When the length of the tether part 400 is much smaller than the sum of the length L1 of the straight line from the completely deployed first chamber 100 to the tube part 300 and the circumference D1 of the opened tube part 300, or specifically when the sum of L2 and D2 is less than 65% of the sum of L1 and D1, the tube part 300 may be closed before the second chamber 200 is completely deployed after the deployment of the first chamber 100. In this case, the first passage 201 may be closed to block a gas flow between the first and second chambers 100 and 200.

Therefore, since the second chamber 200 does not secure inner pressure for protecting the head H of the passenger, the head H or neck of the passenger may be injured in case of an oblique collision.

When the length of the tether part 400 or specifically the sum of the length L2 of the straight line from the first chamber 100 to the tube part 300 in the middle stage of the deployment of the airbag apparatus 1 in FIG. 4 and the circumference D2 of the tube part 300 having the same length as the tether part 400 positioned in the closed tube part 300 ranges from 65% to 75% of the sum of the length L1 of the straight line from the first chamber 100 to the tube part 300 in the initial state of the airbag apparatus 1 in FIG. 3 and the circumference D1 of the opened tube part 300 or desirably corresponds to 70%, the second chamber 200 may be completely deployed, and the tube part 300 may be closed (refer to FIG. 7). Therefore, the head H of the passenger can be held.

When the tube part 300 is closed, a gas flow from the second chamber 200 to the first chamber 100 may be blocked. Thus, the inner pressure of the second chamber 200 can be maintained, and the head H of the passenger can be prevented from moving in a diagonal direction based on the front of the vehicle in FIG. 2, in case of an oblique collision of the vehicle.

In case of an oblique collision of the vehicle, the head H of the passenger may be moved in a diagonal direction (left bottom in FIG. 2) based on the front, compared to a head-on collision of the vehicle. As the head H of the passenger is moved obliquely toward the front, the head H may be held between the first and second chambers 100 and 200.

When the length of the tether part 400 exceeds 75% of the sum of the length L1 of the straight line from the completely deployed first chamber 100 to the tube part 300 and the circumference D1 of the tube part 300 in the case where the first passage 201 is opened, the tube part 300 may not be still tightened even after the second chamber 200 is completely deployed. In this case, the first passage 201 may not be closed.

Therefore, the gas within the second chamber 200 may flow into the first chamber 100 through the first passage 201, and the support force or holding force of the second chamber 200 with respect to the head H of the passenger may be reduced.

Therefore, the second or first chamber 200 or 100 may be pressed against the head H and prevent a turn of the head H, which makes it possible to shorten the time required for holding the head H. Since a turn of the passenger is prevented in case of an oblique collision of the vehicle, it is possible to prevent an injury to the head H or neck of the passenger.

In accordance with the embodiment of the present invention, since the length of the tether part is smaller than the sum of the length of the straight line from the completely deployed first chamber to the tube part and the circumference of the tube part, the tube part may be closed after the second chamber is completely deployed. Thus, the internal pressure of the second chamber can be maintained.

Furthermore, since the tube part is closed after the second chamber is completely deployed, a gas flow from the second chamber to the first chamber may be blocked.

Furthermore, since the tube part is closed after the second chamber is completely deployed, the head or neck of the passenger can be prevented from being injured while the head of the passenger is suppressed from moving in a diagonal direction toward the front.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An airbag apparatus for use in a vehicle comprising:
   an inflator configured to generate gas;
   a first chamber cushion connected to the inflator, and configured to inflate with the gas from the inflator for supporting the head of a passenger in case of a head-on collision of a vehicle;
   a second chamber cushion connected to one side portion of the first chamber cushion, the second chamber being configured to inflate with the gas from the first chamber and expand toward the rear of the vehicle for suppressing the head of the passenger from moving in a diagonal direction in case of an oblique collision of the vehicle;
   a tube part connecting the first and second chamber cushions and configured to allow the gas to flow from the first chamber cushion to the second chamber cushion therethrough; and
   a tether comprising one end coupled to the first chamber cushion at a coupled location and the other end comprising a tether loop that is arranged along a circumference of the tube part and configured to snare the tube part,
   wherein the tether has a length smaller than the sum of the circumference of the tube part and a distance from the coupled location to the tube part measured when the first chamber cushion is completely deployed such that, when the first chamber cushion is deployed, the tether is tightened to cause the tether loop to close the tube part for inhibiting the gas in the second chamber cushion from flowing back to the first chamber cushion.

2. The airbag apparatus of claim 1, wherein the length of the tether ranges from 65% to 75% of the sum.

3. The airbag apparatus of claim 1, wherein the tube part comprises a ring-shaped tightening part that is configured to accommodate the tether loop.

4. The airbag apparatus of claim 1, wherein the tube part is formed of the same material as the first and second chamber cushions.

* * * * *